United States Patent Office 3,503,777
Patented Mar. 31, 1970

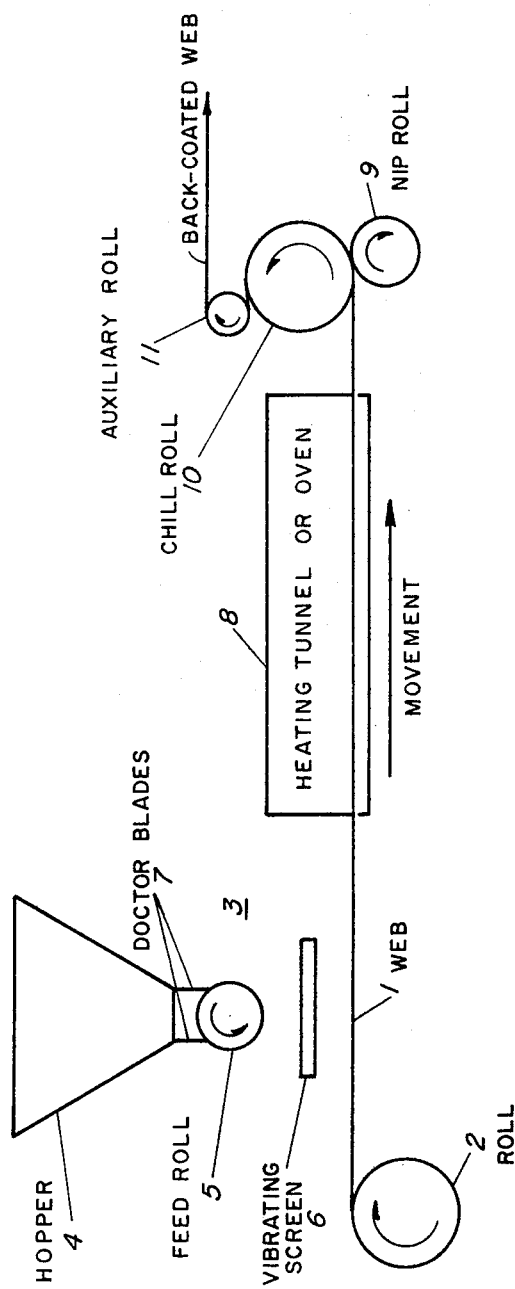

3,503,777
BACKING FOR CARPETS AND PROCESS
FOR PRODUCING SAME
George Kappas, Champaign, and Alfred B. Zimmerman, Tuscola, Ill., assignors to National Distillers and Chemical Corporation, New York, N.Y., a corporation of Virginia
Filed Mar. 21, 1966, Ser. No. 536,045
Int. Cl. C08g 45/04; B44d 1/44
U.S. Cl. 117—21                                    13 Claims

ABSTRACT OF THE DISCLOSURE

Process of coating a fiber bundle web comprising applying thereto a high molecular weight polyolefin and a low molecular weight polyolefin and then applying pressure to the web while the polyolefins are in the molten stage, the pressure causing the molten polyolefins to penetrate through said web, said polyolefins being cooled and thereby solidifying at least the low molecular weight polyolefin completely penetrates the fiber bundle of the web. A carpet comprising a fiber bundle substrate penetrated and bonded with the polyolefins as defined above is also claimed.

---

This invention relates to textile coatings, and more particularly to a technique involving the use of thermoplastics in the coating of carpets and the like.

A number of materials have been proposed for the pupose of coating textiles, and more especially the coating of carpets. For example, latex has been used for this purpose. It has also been known in the art to employ polyolefins, most commonly polyethylene, for the backing of automobile carpets.

Polyethylene backing has been tried for some domestic carpets, but its application to date in large volume has been in the coating of automobile carpets. It is most advantageously applied here because of the thermoforming capability conferred on the carpets. The automobile carpets so treated can be readily molded into desired shapes, and this is a most important atribute.

Other advantages of polyethylene are the low cost of equipment required for its application, less floor space needed for the equipment, better insulation against damp conferred on the carpet, no odor given to the carpet, dry cleaning possible, line speeds high, and no adhesive needed for bonding secondary jute backing.

Despite the widespread application of polyethylenes as noted above, several difficulties attend its use. Among these difficulties there are the facts that the carpet is difficult to stretch and the fiber penetration is not so good as when latex has been employed. Another difficulty is that there is a reduction in the strength of so-called fiber-lock.

The present invention is directed to overcoming, among other things, the difficulties and disadvantages present because of this lack of fiber-lock. The criteria for carpet backing materials are strength and ability to penetrate. In general high molecular weight polyolefins have good strength but poor ability to penetrate, whereas the opposite is true of the low molecular weight polymers. It has now been discovered that if, instead of using either the conventional high molecular weight polyolefin or the conventional low molecular weight polyolefin alone, a combination of a high molecular weight polyolefin and a low molecular weight polyolefin is applied to the carpet, a much higher degree of penetration of the fibre bundle is realized. It is also possible to achieve satisfactory results with certain single thermoplastic materials, such as stereo block polypropylene or polyethylene of intermediate molecular weight, i.e., about 10,000 to 20,000. This results in a carpet having the necessary piling and abrasion-resistance properties as well as the tuft-pull strength required. As is well-known, these properties are especially important for domestic and institutional carpeting, as well as for automobile carpeting.

Briefly considered, the present invention provides, broadly, a technique of applying in combination both a low molecular weight and a high molecular weight thermoplastic, such as polyethylene, to the back of a web, such as a carpet, and of fusing and incorporating such combination of thermoplastics into the web. By the term high molecular weight thermoplastic is meant one with a molecular weight greater than about 20,000 and by low molecular weight thermoplastic is meant one having a molecular weight of about 10,000 or less. The polymers suitable for use in this invention as the high molecular weight component are, for example, the normally solid homopolymers of ethylene described in Fawcett, U.S. Patent 2,153,553. These polymers are tough solids at normal temperatures with a fusion point of about 250° F., corresponding in composition substantially to $(CH_2)x$, and showing a crystalline structure by X-ray diffraction. Generally, they have molecular weights in excess of 20,000 measured according to the method described in U.S. Patent 2,153,553. Other conventional homopolymer and/or copolymer high molecular weight thermoplastics can be used. As the low molecular weight thermoplastic, stereo block polypropylene, petroleum or paraffin waxes, polyethylene waxes, and polyethylene microcrystalline waxes can be used. Further combinations of high and low molecular weight thermoplastics that can be applied with good results are blends, such as both dry blends and melt homogenized blends, of low molecular weight homopolymer and/or copolymer polyolefins or microcrystalline waxes with conventional homopolymer and/or copolymer high molecular weight polyolefins. Low molecular weight vinyl acetate/ethylene copolymers and/or methyl acrylate/ethylene copolymers result in good penetration.

In accordance with the technique of the present invention, a wide variety of methods may be utilized for the application of the aforesaid combination of thermoplastics as a carpet backing. One preferred form involves an application of the thermoplastic, for example, as a powder, onto the back of the web. In another embodiment of the technique, rather than using a powder a quantity of the thermoplastic blend in the molten state may be extruded onto the back surface of the carpet; however, this latter method is particularly adapted for use with high molecular weight thermoplastics. For the low molecular weight thermoplastics, another way of applying such material would be by means of what is known as hot melt, that is, pumping out the material directly onto the back surface. It is also possible to apply the high and the low molecular weight thermoplastics separately to the carpet back. It will be appreciated by those skilled in the art that various combinations of the application methods briefly considered above can also be employed. For example, it may be found in practice that it is preferable to blend the combination of thermoplastics before the application stage, that is, before actually applying the coating to the back of the carpet.

In the preferred embodiment of the technique of the present invention, the aforenoted combination of thermoplastics, having been applied in powder form to the back of the web, is subjected to infrared heating whereby the powdered material melts and penetrates the web. Thereafter, the web is passed through a lower temperature station where pressure is applied to the web, thereby squeezing the resins in order to obtain the ultimate penetration into the web. Because of the lower temperature at this stage, the resins then solidify. The foregoing and other objects, features, and advantages of the invention will be apparent from the following more particular description of preferred embodiments of the invention.

The figure is a schematic representation of apparatus suitable for carrying out one form of the technique of the present invention.

Referring now to the figure, there is shown a layout for coating a carpet with the blended combination of materials envisioned by the present invention, thereby obtaining adequate penetration of the fiber bundle constituting the web or carpet.

The web 1 is unwound by means of the roll 2 and moved in the direction shown by the arrow past a material-applying station 3 comprising a hopper 4 containing the combination of thermoplastic powders to be applied to the web 1. The material in the hopper 4 is fed for application by means of feed roll 5, and the material passes through a vibrating screen 6 which is situated between the hopper 4 and the web 1. A pair of doctor blades 7 is included as part of the hopper 4.

The web 1 next passes through a heating tunnel or oven 8 which contains conventional source of infrared radiation, not shown. The rate of coating may be varied by altering the length of the tunnel 8 and the power of the heaters therein. The effect of the heating tunnel or oven 8 is to melt the combination of thermoplastic materials, which have been applied in powder form to the web 1.

The web 1 is now moved between the nip or pressure roll 9 and the chill roll 10. The thermoplastic materials thereby are forced into the web 1, and, because of the characteristics noted previously, these materials completely penetrate the fiber bundle of the web 1. The finished back-coated web is then taken off from an auxiliary roll 11.

It will be appreciated that, although in the description immediately above of the preferred technique the several thermoplastics were placed together in the single hopper 4 depicted in the figure, other variations of this technique can be practised. For example, several stations like the station 3 can be set up, each having a different hopper and each containing one of the thermoplastics to be applied. Also, if desired, when more than one station is used, a separate heating cycle may be employed for each of the applied materials. Thus distinct heating tunnels may be arranged in the layout or, alternatively, a first thermoplastic can be applied to the web 1 and a heating cycle used for it, and this can be followed by running the web 1 a second time past the same heating tunnel 8 following application of the second thermoplastic to the web 1.

As noted hereinabove, a variety of combinations of materials is possible within the technique of the present invention. In general, a number of test runs were made using a combination of a low molecular weight polyolefin, such as polyethylene microcrystalline waxes with conventional high molecular weight polyolefin. These materials were first blended together by a dry blend technique, but it will be understood that they could also have been melt-blended together. The blends were usually in the proportion 33/67 of low molecular weight to high molecular weight material; however, proportions of as low as about 1/99 and as high as 90/10 could be used; the preferred proportions are between about 5/95 and about 70/30.

Also, generally speaking, the range of temperatures used varied from about 300° to about 550° F. In the two-step operation using separate heating cycles, the temperature of each step can be about 300° to 550° F. Better results have been obtained, however, when the low molecular weight material is heated at a temperature lower than that used for heating the high molecular weight material, e.g., at about 300° to 450° F. for the low and about 400° to 550° F. for the high.

When the various blends of the polyolefins were applied, it was found that a time period of 10 to 60 seconds was required to reach the molten condition when passing through the heating tunnel. When the combination of materials had sufficiently fused and had penetrated the fiber bundle, it was found that the chill roll should be maintained at a temperature of approximately 100° F. in the case of a slow run and that generally the range was between about 60° F. and 90° F. The total amount of material applied in a typical run varied between about 8 and 16 ounces per square yard for the case of a 33/67 blend including the low molecular weight material in the form of polyethylene microcrystalline wax. This blend, however, could be varied to as much as 90 parts of the low molecular weight material with 10 parts of the high molecular weight or as low as 1 part of the low molecular weight material with 99 parts of the high molecular weight material.

Although this invention has been discussed with regard to the use of thermoplastics for coating carpet backing, it is also possible to use thermoset materials utilizing techniques similar to those described herein.

The following examples are given to aid in understanding the present invention. It is understood, however, that the invention is not limited to the specific compositions, conditions of application, or specific properties of the compositions given in the examples. All proportions throughout these examples are by weight unless otherwise noted.

EXAMPLE I 16-mesh low molecular weight polyethylene wax powder having a molecular weight less than 10,000 (42 parts) was dry blended with 16-mesh high molecular weight polyethylene (22 melt index, 0.923 density) having a molecular weight greater than 20,000 (58 parts) at room temperature in a laboratory blender. The blended powder was metered onto the back of a looped-pile, tufted carpet having a composition of 80% rayon and 20% nylon at a coating weight of 12 ounces per square yard. The polyethylene coating was subjected to a high intensity infrared heater for one minute at which point the blend of polyethylene powders melted. Temperature of the polyethylene was estimated at 450° F. The carpet was then nipped using a hand roller and moderate pressure (1) to cause the low molecular weight polyethylene wax to fully penetrate the fiber bundle, (2) to cause the high molecular weight polyethylene to better adhere to the carpet back, (3) to smooth out the coating, and (4) to cool and solidify the polyethylene coating. This sample was labeled Sample A.

As a control, 12 ounces per square yard of the high molecular weight polyethylene powder was applied to the same type of carpet under exactly the same conditions as Sample A. This sample was labeled Sample B.

Samples A and B were then tested on the carpet face on a Taber abraser utilizing H–10 abrasion wheels and 1000-gram weights at each end for 1500 cycles. Sample A lost 1.1 grams whereas Sample B lost 2.4 grams, indicating a considerable improvement in wear characteristics when using the dry blend of the two powders.

Samples A and B were then tested for tuft-pull strength by means of a hand spring tester. The tuft-pull strength of Sample A was greater than 10 pounds, whereas that of Sample B was approximately three pounds.

Visual examination of the fiber bundle revealed that the blend of powders used in making Sample A completely penetrated the fiber bundle, whereas the powder used in making Sample B did not penetrate into the fiber bundle.

EXAMPLE II 16-mesh low molecular weight polyethylene wax powder having a molecular weight less than 10,000 (33 parts) was metered onto the back of continuous filament nylon carpet at a coating weight of four ounces per square yard. The coating was subjected to a high intensity infrared heater for several seconds to melt the powder and cause it to adhere to the back of the carpet. High molecular weight polyethylene powder (16 mesh, 22 melt index, 0.923 density) having a molecular weight greater than 20,000 (67 parts) was then metered onto the back of the carpet at a coating weight of eight ounces per square yard. The back of the carpet containing the unfused powder was heated with an infrared heater for one minute at which point the polyethylene was completely melted. Temperature of the polyethylene was estimated at 450° F. The carpet was then nipped using a hand roller and moderate pressure (1) to cause the low molecular weight material to penetrate the fiber bundle, (2) to cause the high molecular weight polyethylene to better adhere to the carpet back, (3) to smooth out the coating, and (4) to cool and solidify the polyethylene coating. This sample was labeled Sample C.

As a control 12 ounces per square yard of the high molecular weight polyethylene powder was applied to the same type of carpet. This coating was heated, nipped, and cooled exactly the same as Sample C. This sample was labeled Sample D.

Visual examination of the fiber bundle revealed that the fiber bundle of Sample C was completely penetrated, whereas the powder used in Sample D did not penetrate into the fiber bundle.

To check the tuft lock and fiber-bundle penetration each sample was subjected to abrasion of the carpet face. A stiff wire brush was stroked under heavy pressure across the carpet face. Sample D pilled (or fuzzed) severely, whereas Sample C was not affected by this abrasion. It was concluded that Sample C had superior tuft lock and wear properties compared to Sample D.

EXAMPLE III 16-mesh low molecular weight polyethylene wax powder having a molecular weight less than 10,000 (50 parts) was melt blended with 16-mesh high molecular weight polyethylene powder (0.923 density, 22 melt index) having a molecular weight greater than 20,000 (50 parts) on a laboratory roll mill until a homogenous mix was obtained. The blended material was then ground through a 20-mesh screen on a laboratory grinder.

The blended powder was metered onto the back of a looped-pile, tufted carpet having a composition of 80% rayon and 20% nylon at a coating weight of 12 ounces per square yard. The carpet was then placed for 10 minutes in a laboratory hot-air circulating oven maintained at 400° F. The carpet was then removed from the oven and nipped using a hand roller under moderate pressure to cool and solidify the polyethylene coating. This sample was labeled Sample E.

As a control, 12 ounces per square yard of the high molecular weight polyethylene powder was applied to the same type of carpet under exactly the same conditions as Sample E. This sample was labeled Sample F.

Samples E and F were then abrasion tested. A Taber abraser having H–10 abrasion wheels and 1000-gram weights at each end was used to wear-test the carpet face for 1500 cycles. Sample E lost 1.1 grams, whereas Sample F lost 1.8 grams.

Visual examination of the fiber bundle revealed that Sample E had a good fiber bundle penetration, whereas Sample F had little, if any, penetration of the bundle.

EXAMPLE IV

Intermediate molecular weight polyethylene having a molecular weight of about 10,000 to 20,000 was ground through a 20-mesh screen on a laboratory grinder. The ground powder was metered onto the back of a looped-pile, tufted carpet having a composition of 80% rayon and 20% nylon at a coating weight of 12 ounces per sequare yard. The carpet was placed for seven minutes in a laboratory hot-air circulating oven maintained at 400° F. The carpet was then removed from the oven and nipped using a hand roller under moderate pressure to cool and solidify the polyethylene coating. This sample was labeled Sample G.

Sample G was abrasion tested at 1500 cycles using a Taber abraser having H–10 abrasion wheels and 1000- gram weights at each end. Abrasion loss with Sample G was 1.1 grams. A previous control sample (Sample F) utilizing a high molecular weight polyethylene coating lost 1.8 grams during this abrasion test (see Example III).

The tuft-pull strength of Sample G was greater than 10 pounds. Visual examination of the Sample G fiber bundle revealed that the polyethylene completely penetrated it.

It was concluded that the intermediate molecular weight polyethylene had (1) the ability to adequately penetrate the carpet fiber bundle to result in carpet having excellent abrasion resistance properties and (2) good strength properties to result in carpet having excellent tuft-pull strength properties.

EXAMPLE V

Stereo block polypropylene was applied to the back of a looped-pile, tufted carpet having a composition of 80% rayon and 20% nylon. The carpet was then treated by the procedure of Example IV, and the results were comparable.

What is claimed is:

1. A process of coating a web constituted of a fiber bundle comprising the steps of:
    (a) applying to a surface of said web a combination of 1 to 90 parts of an ethylene polymer having a molecular weight up to about 10,000 and 99 to 10 parts of an ethylene polymer having a molecular weight above about 20,000.
    (b) heating said polymers to a temperature within the range 300° F. to 550° F., whereby the polymers are rendered molten and caused to penetrate the fiber bundles,
    (c) applying pressure to the web to effect substantially complete penetration of the web by said polymer combination, and
    (d) cooling the resulting product.

2. A process as defined in claim 1 wherein each of the ethylene polymers utilized is applied in the form of a powder.

3. The process of claim 1 wherein both of the ethylene polymers are homopolymers.

4. A process as defined in claim 1 wherein a blend of the high and low molecular weight ethylene polymers is utilized.

5. A process as defined in claim 4 including the step of cooling the melted blend of thermoplastic powders while applying pressure to the web to the temperature required to solidify same.

6. A process of coating a carpet constituted of a fiber bundle comprising the steps of
    (a) applying separately to said carpet an ethylene polymer having a molecular weight up to about 10,000 and an ethylene polymer having a weight above about 20,000,
    (b) heating the applied ethylene polymers to a temperature within the range 300° F. to 550° F. whereby the ethylene polymers are rendered molten and caused to penetrate the fiber bundles, said ethylene polymers being present in an amount of from about 1 to about 90 parts of said ethylene polymer having a molecular weight up to about 10,000, and from about 99 to about 10 parts of said ethylene polymer having a molecular weight above about 20,000,
    (c) applying pressure to the carpet to effect substantially complete penetration of the carpet by said molten ethylene polymers, and
    (d) cooling the resultant product.

7. A process as defined in claim 6 wherein each of the ethylene polymers is applied in the form of a powder.

8. The process of claim 6 wherein both of the ethylene polymers are homopolymers.

9. A process of coating a carpet constituted of a fiber bundle comprising the steps of (a) applying a first ethylene polymer having a molecular weight up to about 10,000 to said carpet,
(b) heating said first ethylene polymer to a temperature within the range 300° F. to 550° F. to melt said first ethylene polymer,
(c) applying a second ethylene polymer having a molecular weight above about 20,000 to said carpet,
(d) heating said second ethylene polymer to a temperature within the range of 300° F. to 550° F. to melt said ethylene polymer, and
(e) applying pressure to the carpet to effect substantially complete penetration of the web by said ethylene polymers, the ethylene polymers comprising 1 to 90 parts of said first ethylene polymer and 99 to 10 parts of said second ethylene polymer.

10. The process of claim 9 wherein both of the ethylene polymers are homopolymers.

11. A process as defined in claim 9 wherein the first step of heating is performed at a temperature of approximately 300 to 450° F., and the second step of heating is performed at a temperature of approximately 400 to 550° F.

12. A carpet comprising a fiber bundle substrate coated with a solidified melt of 1 to 90 parts of an ethylene polymer having a molecular weight up to about 10,000 and 99 to 10 parts of an ethylene polymer having a molecular weight above about 20,000, said solidified melt substantially completely penetrating said fiber bundle substrate.

13. The product of claim 12 wherein both of the ethylene polymers are homopolymers.

References Cited

UNITED STATES PATENTS

| | | | |
|---|---|---|---|
| 2,513,434 | 7/1950 | Tinsley | 117—21 X |
| 3,000,754 | 9/1961 | Zentmyer | 117—25 X |
| 3,002,849 | 10/1961 | Harmon | 117—21 |
| 3,088,848 | 5/1963 | Tritsch | 117—122 |
| 3,149,988 | 9/1964 | Penman | 117—21 |
| 3,150,023 | 9/1964 | Penman | 117—21 X |
| 3,219,507 | 11/1965 | Penman | 117—33 X |
| 3,231,636 | 1/1966 | Snyder et al. | 260—897 |
| 3,243,396 | 3/1966 | Hammer | 260—897 |
| 3,247,290 | 4/1966 | Werkman et al. | 260—897 |
| 3,348,995 | 10/1967 | Baker et al. | 117—21 X |

WILLIAM D. MARTIN, Primary Examiner

P. F. ATTAGUILE, Assistant Examiner

U.S. Cl. X.R.

117—65.2, 143, 161; 260—837